(12) United States Patent
Nashiki et al.

(10) Patent No.: US 6,208,108 B1
(45) Date of Patent: Mar. 27, 2001

(54) CONTROLLER FOR RELUCTANCE TYPE SYNCHRONOUS MOTOR

(75) Inventors: Masayuki Nashiki; Akiyoshi Satake, both of Niwa-gun (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 09/318,845

(22) Filed: May 26, 1999

(30) Foreign Application Priority Data

Jun. 10, 1998 (JP) .................................................. 10-161869

(51) Int. Cl.[7] ........................................................ H02P 1/46
(52) U.S. Cl. ............................................ 318/701; 318/254
(58) Field of Search ..................................... 318/701, 254, 318/696, 685

(56) References Cited

U.S. PATENT DOCUMENTS 4,743,825 * 5/1988 Nashiki .................................. 318/723
5,936,372 * 8/1999 Nashiki et al. ....................... 318/701

* cited by examiner

Primary Examiner—Khanh Dang
(74) Attorney, Agent, or Firm—Oliff & Berridge, PLC

(57) ABSTRACT

A controller for a reluctance type synchronous motor. When field current control depends solely on a rotor speed, large power consumption and heat generation of a motor may be caused. Also, when a field current is small, torque consumption becomes small, resulting in a prolonged acceleration time. To address the above problems, there is provided a section for generating a field current command SIFC using a field current compensation coefficient SKF having been obtained based on a torque command STC. With this arrangement, a large field current SIFC flows when a torque is needed, and a small field current SIFC flows when torque is not needed. There is also provided a section for generating an armature current command SIAC using armature current command compensation SKA having been obtained based on a field current command SIFC. With this arrangement, variation of a torque constant due to variation of a field current is converted into an armature current command SIAC based on a field current command SIFC.

4 Claims, 15 Drawing Sheets

CONTROLLER FOR RELUCTANCE TYPE SYNCHRONOUS MOTOR

BACKGROUND OF THE INVENTION

1. Field of the Invention

The present invention relates to a controller for a synchronous motor used for a machine tool, and so on, and particularly to a controller for a reluctance type synchronous motor.

2. Description of the Related Art

A permanent magnet type synchronous motor using a permanent magnet for a rotor has conventionally been used for positioning a machine tool or driving a feeding spindle of a machine tool. When applying an electric current to such a motor, only the amplitude and phase of an armature current (torque current) must be controlled. In this motor, however, as the magnetic force of the magnet cannot be controlled, the magnetic field cannot be desirably controlled using, for example, a field weakening control (a constant output). Consequently, the inductive voltage between terminals exceeds the power source voltage, becoming saturated when the rotation speed reaches or exceeds a designed rotation speed (hereinafter referred to as a base rotation speed), causing a problem of unstable control.

Therefore, instead of a permanent magnet type motor, a reluctance type electric motor capable of using independently controlled field and armature currents is used. With such a motor, a field current is weakened in accordance with a rotor speed (which is equivalent to reduction of the magnetic force of a magnet) when the rotor speed reaches or exceeds the base rotation speed, so that control can be made stable even when the rotor speed is equal to or higher than the base rotation speed.

FIG. 15 is a block diagram showing an example of a conventional controller for a reluctance type synchronous motor.

An adder 1 obtains a speed difference DIF based on a speed command SVC and a rotor speed SPD, and outputs the obtained speed difference DIF to a PI controller 2, the speed command SVC being instructed by a higher order controller (not shown) and the rotor speed SPD being obtained through conversion by a differentiator 11 using a rotor position SP read by a detector 10 mounted on a motor 6. The PI controller 2 then obtains a torque command STC by multiplying the speed difference DIF and a speed loop gain to output to a torque command-current converter 7. The torque command-current converter 7 then performs level conversion in a level converter 71, so that the torque command STC is converted into an armature current amplitude command SIQ. After multiplication by an output from a phase distributor 73 in a multiplier 72, a resultant armature current command SIAC is output to an adder 3.

Meanwhile, in the field current calculator 9, a field current coefficient calculator 91 outputs, referring to the rotor speed SPD, a field current coefficient SKD in accordance with a function pattern 21 shown in FIG. 2(a) (a curved line function taking a constant value with a rotor speed equal to or lower than a base rotation speed Nbase, and depending on a rotor speed SPD equal to or higher than a base rotation speed Nbase). The output coefficient SKD is multiplied by a default field current IDC in a multiplier 93 so that the resultant field current amplitude SID is output to a multiplier 94. In the multiplier 94, the field current amplitude SID is multiplied by an output from a phase distributor 95, so that the resultant field current command SIFC is output to the adder 3. The phase of the field current command SIFC is displaced by $\pi/2$ from that of the armature current command SIAC as a result of processing by a phase converter 97 and an adder 96. The adder 3 performs vector addition using the armature current command SIAC and the field current command SIFC, so that a resultant combined current command SIC is output to a phase distributor 4. Thereafter, current commands SIUC and SIVC with respective phases are amplified in an amplifier 5, and the result is output to drive the motor 6.

In the above conventional controller for a reluctance type synchronous motor, field current control depends solely on the rotor speed SPD, and field weakening control is applied only when a rotor speed is equal to or more than the base rotation speed Nbase. Moreover, because of an arrangement in which a large field current flows when a large toque is necessary, a field current always flows even when no torque is required, e.g., when the motor is stopped or operating at a constant speed. This leads to problems of a large power consumption and heat generation of the motor. On the other hand, when a field current is small, a torque constant becomes small, which only enables generation of a smaller torque for the same armature current. This leads to problems of a prolonged motor acceleration time and, when applied to a machine tool, a prolonged machining cycle. Moreover, if an armature current is large in view of a field current, armature reaction may be caused, deteriorating torque linearity with respect to an armature current and, as a consequence, lowering a torque constant.

The influence of the drop in torque constant may appear as machining fringes on a work piece being cut, or deteriorating machining accuracy.

SUMMARY OF THE INVENTION

The present invention has been conceived to overcome the above problems and aims to provide a controller for a reluctance type synchronous motor, which is superior in controllability and can achieve efficient control with small power consumption.

In order to achieve the above object, according to the present invention, there is provided a controller including a reluctance type synchronous motor having, inside a rotor, magnetic force insulation means such that magnetic reluctance caused on a surface of the rotor made of soft magnetic material is different in a rotation direction viewed from a stator, whereby magnetomotive force due to the stator is generated penetrating a magnetic pole, where the magnetic reluctance is weak, for generation of a torque to rotate the magnetic pole of the rotor to move in a direction of the magnetomotive force, detection means for detecting a rotor position of the rotor, and, current command calculation means for obtaining a current command by adding an armature current command and a field current command at the rotor position for supplying a current to the synchronous motor. The controller comprises a calculator for obtaining a field current command by multiplying a field current command corresponding to the rotor speed, and a coefficient supplied from a field current compensation coefficient calculator, the coefficient corresponding to a torque command.

Further, the above controller may further comprise an armature current compensation calculator for calculating an armature current command by calculating a compensation value with reference to an armature current command, and compensating an armature current amplitude using the calculated compensation value.

According to the above invention, field current can be actively controlled when a calculator is provided which calculates a field current command by multiplying a field current amplitude calculated with reference to the rotor speed, and a coefficient obtained by a function generator referring to a torque command. This enables reduction of a field current when a small torque is needed, achieving reduction of power consumption and heat generation. Also, variation of a torque constant due to variation of a field current can be suppressed when an armature current compensation calculator is provided which calculates an armature current command by calculating a coefficient with reference to an armature current command, and multiplying the coefficient to an armature current amplitude. This enables reduction of an acceleration time and, when applied to a machine tool or the like, reduction of the machining cycle.

Still further, the above controller may comprise a field current amplitude calculator for outputting a constant field current, and a phase shift calculator for calculating a phase shift amount by multiplying a code value output from a polarity judgment section referring to a torque command or an armature current, and a function with reference to the torque command or an armature current amplitude.

According to the above invention, field and armature current components of a combined current can be actively controlled when providing a field current amplitude calculator for outputting a constant field current, and a phase shift calculator for calculating a phase shift amount by multiplying a code value output from a polarity judgment section referring to a torque command or an armature current, and a function referring to a torque command or an armature current amplitude. This enables reduction of a field current when a small torque is needed, achieving reduction of power consumption and heat generation. Also, as variation of a torque constant can be suppressed, an acceleration time can be reduced, and a machining cycle can also be reduced when the above invention is applied to a machine tool or the like.

Yet further, the above controller may comprise a field current amplitude calculation section for outputting a constant field current; and a field current compensator for adding a torque command or an armature current to the field current amplitude.

According to the above invention, field and armature current components of a combined current can be actively controlled when providing a field current amplitude calculator for outputting a constant field current, and a field current compensator for referring a torque command or an armature current referred to add to the field current amplitude. This enables reduction of a field current when a small torque is needed, achieving reduction of power consumption and heat generation. Also, as variation of a torque constant can be suppressed, an acceleration time can be reduced, and a machine cycle can also be reduced when the above invention is applied to a machine tool or the like.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

Figure 1:
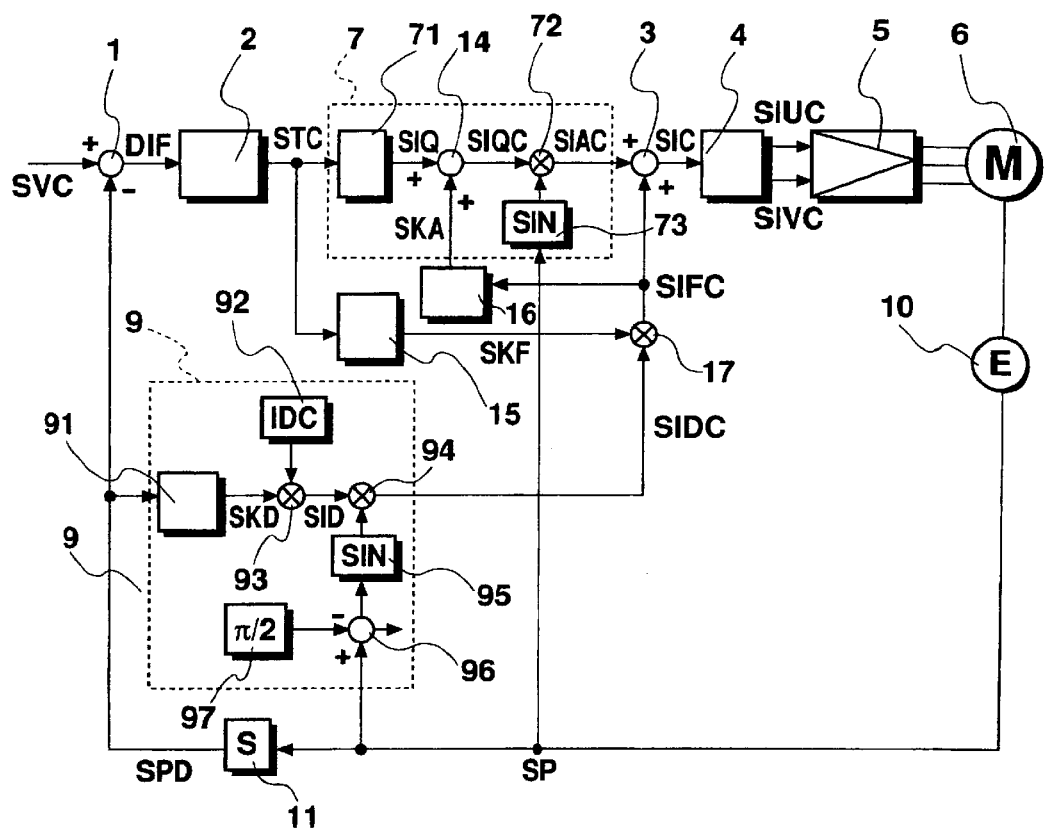
FIG. 1 is a diagram showing a controller for a reluctance type synchronous motor according to a first preferred embodiment of the present invention.

In the following, first through third preferred embodiments of the present invention will be described. Note that components and signals denoted by the same marks and reference numerals have the same functions unless otherwise stated.

FIG. 1 is a diagram relating to a first preferred embodiment of the present invention, which includes a field current compensation coefficient calculator 15 and an armature current compensation calculator 16 in addition to a conventional structure. A first preferred embodiment will be described referring to the accompanying drawings.

The field current compensation coefficient calculator 15 obtains a field current compensation coefficient SKF based on a function requiring reference to a torque command STC, and outputs the result to a multiplier 17. The multiplier 17 multiplies the field current compensation coefficient SKF and a field current command SIDC, obtained by a field current calculator 9, to obtain a compensated field current command SIFC, which is then supplied to the armature current compensation calculator 16 and the adder 3.

In the armature current compensation calculator 16, an armature current command compensation SKA is obtained according to the input field current command SIFC, and output to an adder 14. The adder 14 adds the armature current command compensation SKA and an armature current amplitude command SIQ to obtain a compensated armature current command SIQC, which is then multiplied by an output from the phase distributor 73, so that a resultant armature current command SIAC is output to the adder 3.

In the adder 3, the field current command SIFC and the armature current command SIAC are added by means of vector addition into a combined current command SIC, which is then output to the phase distributor 4. Thereafter, current commands SIUC, SIVC with respective phases are amplified in the amplifier 5 before being output to drive the motor 6.

Figure 2A:
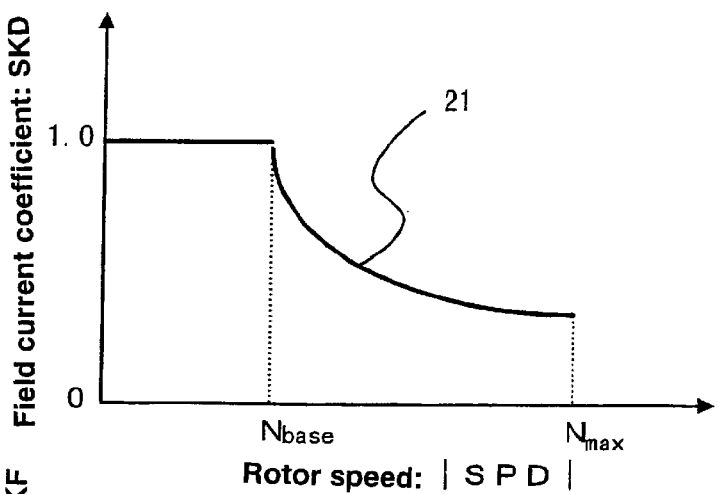
FIGS. 2(a–c) are diagrams showing an example of function patterns applied to a field current coefficient calculator 91, a field current compensation coefficient calculator 15, and an armature current compensation calculator 16, respectively.
Figure 2B:
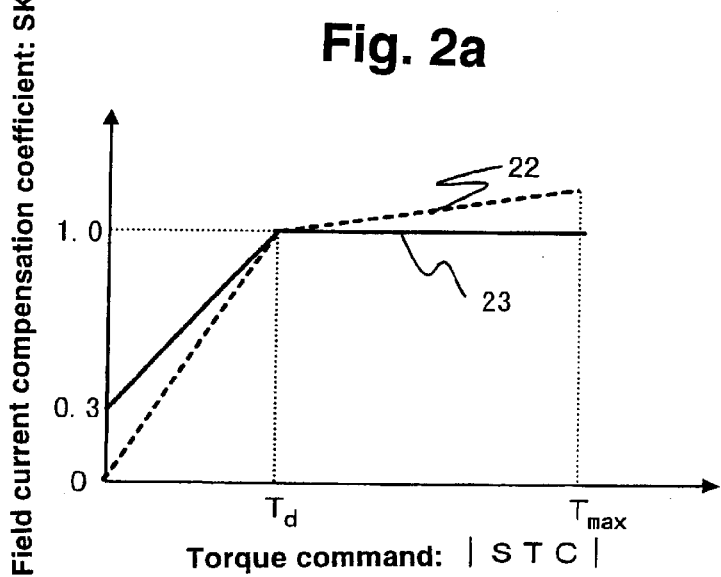
Figure 2C:
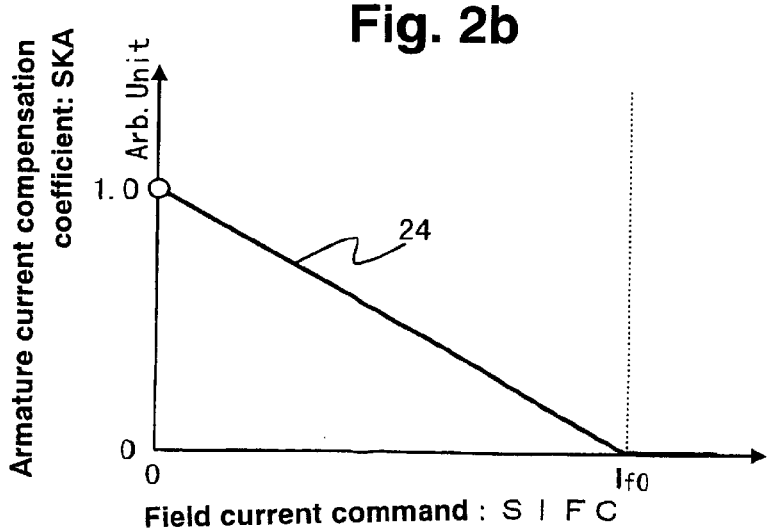

FIGS. 2(a), 2(b), and 2(c) show pattern examples of functions applied to the field current coefficient calculator 91, the field current compensation coefficient calculator 15, and the armature current compensation calculator 16, respectively. Specifically, FIG. 2(a) relates to processing in the field current coefficient calculator 91, explanation of which is not repeated here as it has already been described in connection with the related art.

FIG. 2(b) relates to processing in the field current compensation coefficient calculator 15. With a function pattern 23 (indicated by the solid line), it is arranged such that a field current compensation coefficient SKF takes a value of 0.3 when a torque command STC is zero (STC=0), and takes a value of 1.0 when a torque command STC is equal to or more than a torque threshold Td. When a torque command STC is between 0 and the torque threshold Td, a field current compensation coefficient SKF is expressed as a linear function of a torque command STC. With a function pattern 22 (indicated by the broken line), differing from the function pattern 23, a field current compensation coefficient SKF takes a value of zero when a torque command STC is zero (STC=0), and takes a value larger than 1.0 (SKF>1.0), not a constant value of 1.0, when a torque command STC is equal to or more than the torque threshold Td. This state has the effect of increasing a field current command SIDC (field strengthening effect).

FIG. 2(c) relates to processing in the armature current compensation calculator 16. According to a function pattern 24, when a field current command SIFC is zero, no processing is applied as compensation is unnecessary. When a field current command SIFC is small, a torque constant for a motor generally drops. As a constant torque constant is desired for stable control over the system, when the field current command SIFC drops, variation of a torque constant can be suppressed by causing a larger armature current to flow. Therefore, when a field current command SIFC is small, an armature current compensation SKA is added to an armature current command SIQ. With the field current command SIFC being larger than If0 (SIFC>If0), the armature current compensation SKA is zero as compensation is unnecessary.

FIG. 3 is a diagram explaining an effect achieved by the field current compensation coefficient calculator 15. Specifically, FIG. 3(a) shows variation of a torque command, while FIGS. 3(b), 3(c), and 3(d) show variation of a field current command SIFC or SIDC with respect to a torque command STC. For brevity of explanation, a region (rotor speed SPD<Nbase) free from field weakening control using a rotor speed SPD (FIG. 2(a), function pattern 21) will be referred to in the following.

It is assumed that a torque command STC varies according to the pattern 30. Conventionally, the field current command SIFC then remains constant (=If0), as pattern 31 shown in FIG. 3(b). In the first embodiment of the present invention, on the other hand, when a field current compensation coefficient SKF obtained based on the function pattern 23 shown in FIG. 2(b) is applied, the field current command SIFC varies according to the pattern 32 shown in FIG. 3(c). Also, when a field current compensation coefficient SKF obtained based on the function pattern 22 shown in FIG. 2(b) is applied, the field current command SIFC varies according to the pattern 33 shown in FIG. 3(c) with the field current SIFC exceeding If0 (in a field strengthening region) in some regions.

Figure 3A:
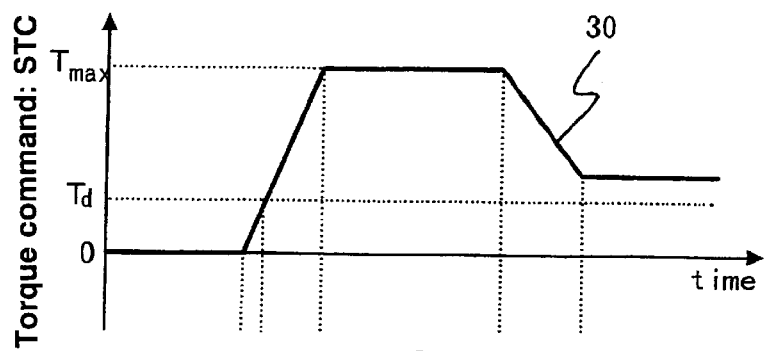
FIGS. 3(a–d) are diagrams showing an effect achieved by the field current compensation coefficient calculator 15.
Figure 3B:
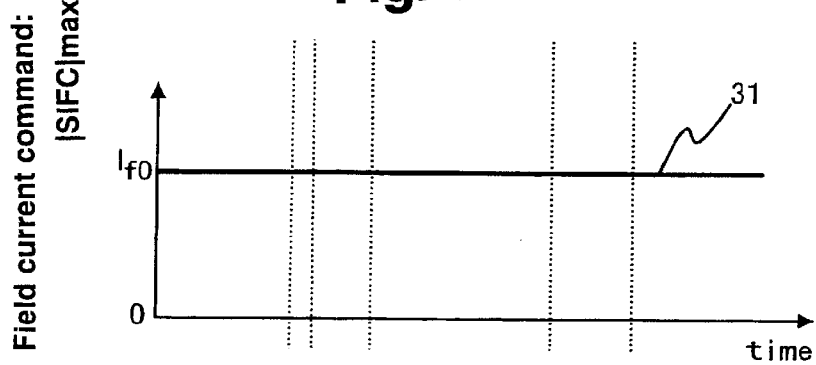
Figure 3C:
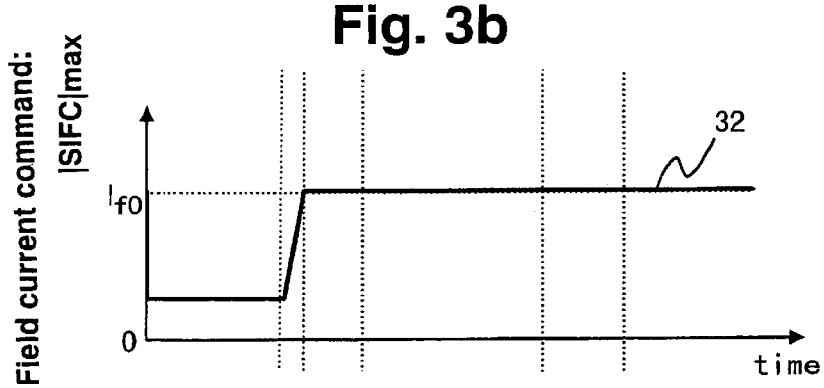
Figure 3D:
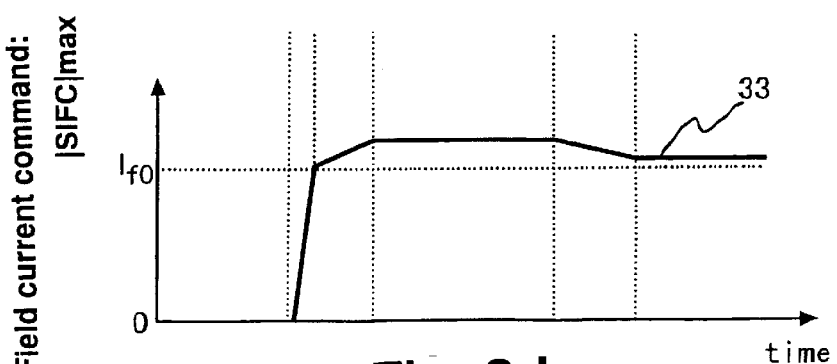

In light of the above, it is appreciated that time-quadrature values are smaller with the patterns 32 and 33 shown in FIGS. 3(c) and (d), compared to the pattern 31 shown in FIG. 3(b). That is, only a smaller field current flows, compared to a conventional design, when torque is unnecessary, resulting in reduction of power consumption and suppression of motor heat generation.

Figure 4A:
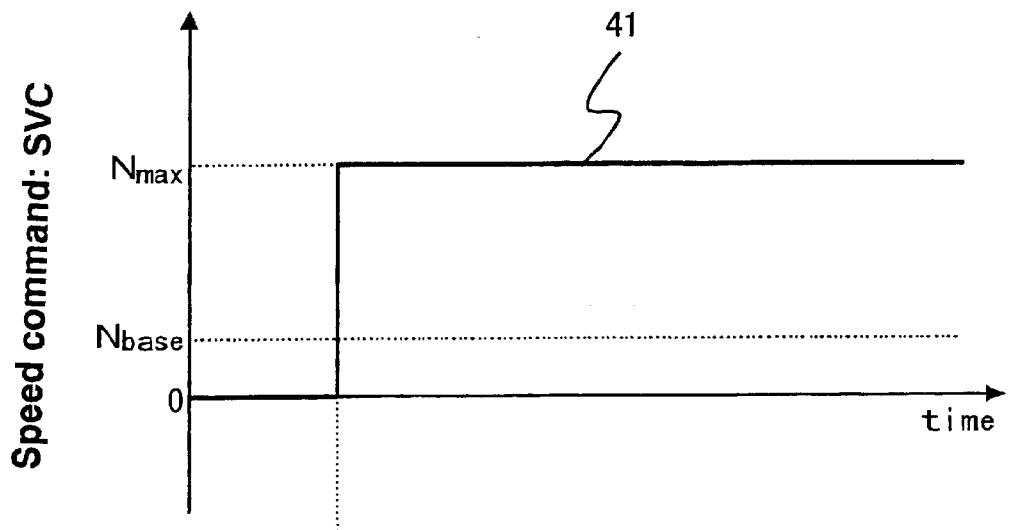
FIGS. 4(a,b) are diagrams showing an effect achieved by the armature current compensation calculator 16.
Figure 4B:
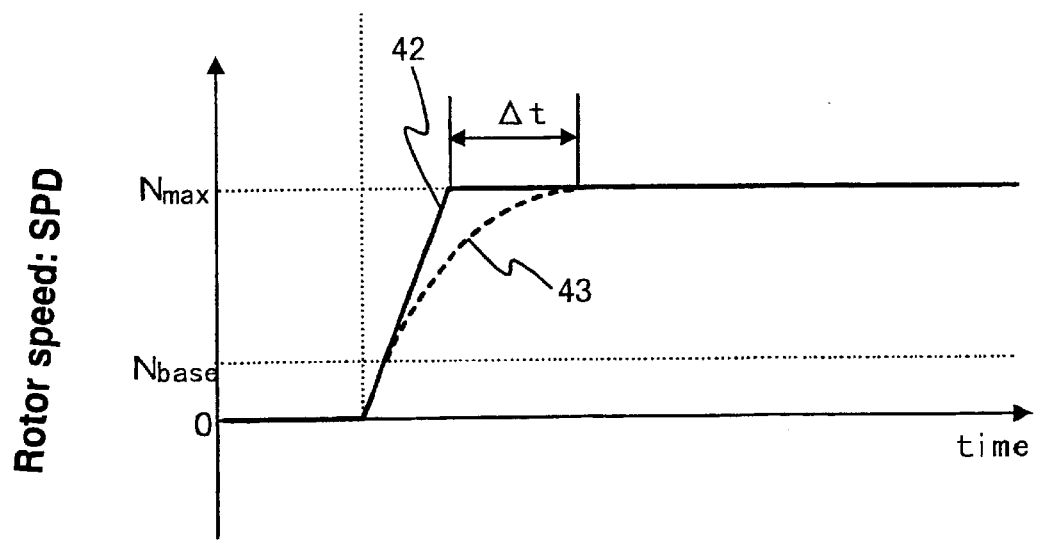

FIG. 4 is a diagram explaining an effect achieved by the armature current compensation calculator 16. Specifically, FIG. 4(a) shows a pattern 41 in which a speed command SVC instructed by a higher order controller increases from zero (SVC=0) to the maximum rotation speed Nmax of a motor. FIG. 4(b) shows response from the motor, expressed in terms of a rotor speed SPD, when a speed command SVC increases as shown in FIG. 4(a). The pattern 43 (indicated by the broken line) represents a conventional acceleration curve achieved without application of the armature current compensation calculator 16. When the rotor speed SPD exceeds the base rotation speed Nbase, the field current command SIFC drops, causing a drop in torque constant and suppression of acceleration as the rotor speed SPD increases. The pattern 42 (indicated by the solid line) represents an acceleration curve achieved with application of the armature current compensation calculator 16. Because of compensation applied for maintaining a substantially non varying torque constant, the acceleration curve becomes close to a straight line, as a result of which an acceleration time can be shortened by Δt compared to that with the acceleration curve without application of the armature current compensation calculator 16, i.e., pattern 43.

Figures 5A, 5B:
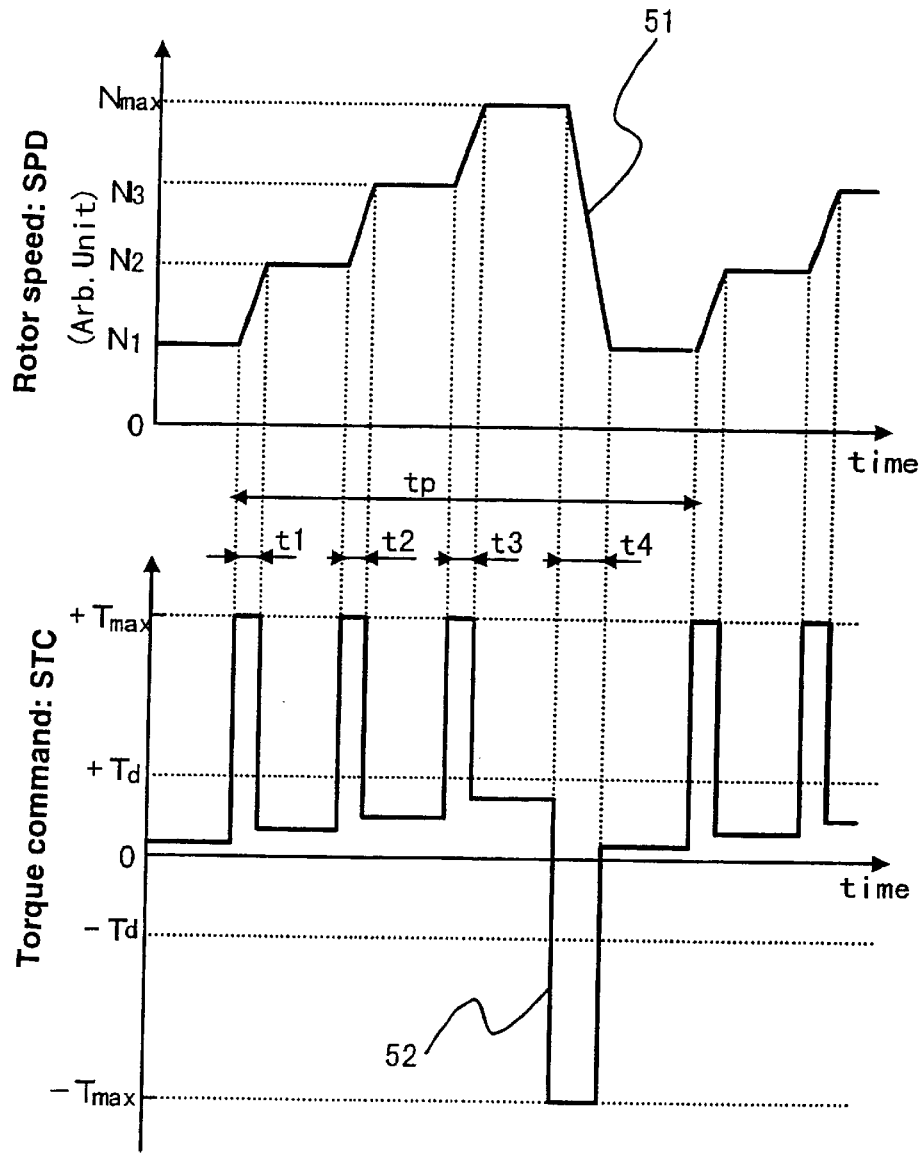
FIGS. 5(a,b) are diagrams showing a motor driving cycle for evaluation in the first preferred embodiment.

FIGS. 5(a) and 5(b) show a rotor speed SPD and a torque command STC, respectively, in evaluation of motor performance. This evaluation method, generally referred to as a duty driving test, is used to evaluate motor performance in terms of heat, wherein a shorter cycle tp means a higher performing motor. FIG. 5(a) shows a repetitive cycle in which the rotor speed SPD accelerates from N1 to N2, N3, finally to Nmax, and decelerates to N1. FIG. 5(b) shows variation in torque command STC during the cycle. "tp" represents a time period for one cycle of a rotor speed SPD, wherein "1" to "4" respectively represent acceleration/deceleration time periods while the rotor speed SPD varies from t2 to t4. In the case of constant rotation, requiring only a small torque, a rotor can be driven with a torque equal to or less than a torque threshold Td. Therefore, a field current command SIDC is lowered by the field current compensation coefficient calculator 15, preventing excessive current flow, as explained referring to FIG. 3. As a result, heat allowance for the motor is ensured, and time other than acceleration/deceleration time (t1 to t4) can be reduced. Further, as a response time is reduced by the armature current compensation calculator 16 during acceleration/deceleration, as described referring to FIG. 4, time tp for the entire cycle can be reduced.

Figure 6:
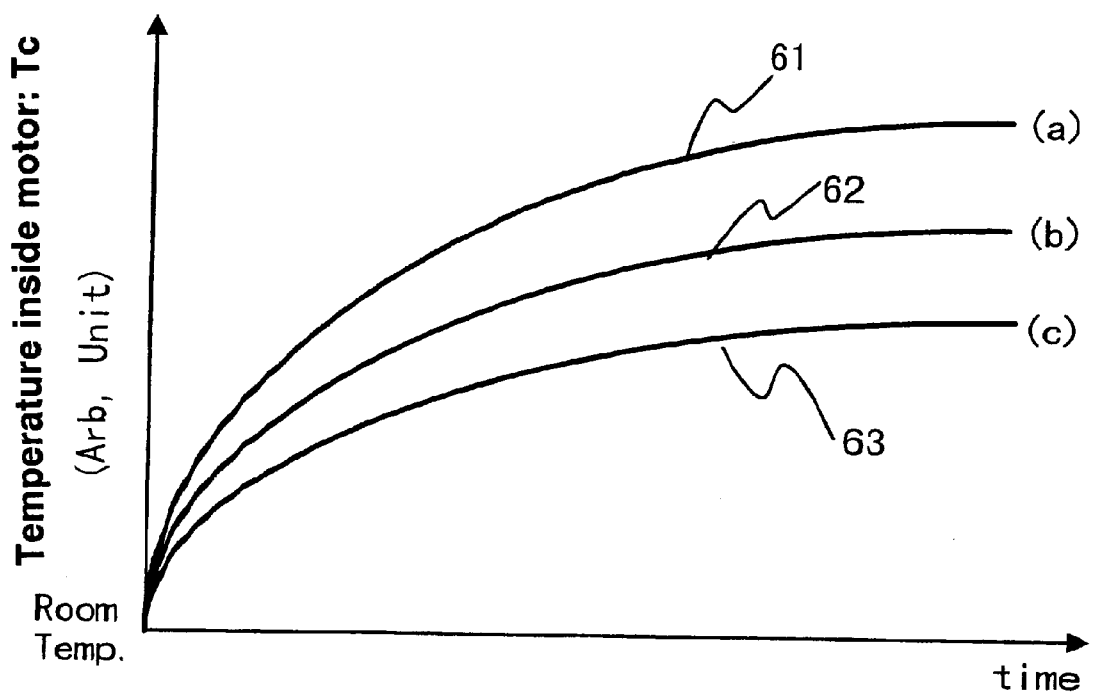
FIG. 6 is a diagram showing an increase of temperature in the inside of the motor in the first preferred embodiment.

FIG. 6 is a diagram showing comparison results concerning temperature increase in the inside of a motor when the duty driving test, described in connection with FIG. 5, is carried out under the same duty cycle conditions. The characteristic curves 61, 62, and 63 respectively represent a conventional temperature increase in the inside of a motor, a temperature increase in the inside of a motor subjected to a test based on the function pattern 23 shown in FIG. 2(*b*), and a temperature increase in the inside of a motor subjected to a test based on the function pattern 22 shown in FIG. 2(*b*). It can be seen from the drawing that, under the same conditions, the temperature in the inside of the motor driven according to the function patterns 22 or 23 shown in FIG. 2(*b*), increases less compared to a conventional design, ensuring heat allowance.

It should be noted that the present invention is not limited to the above first preferred embodiment, and may be modified as follows without departing from the gist thereof.

(1) An armature current amplitude command SIQ before compensation and an armature current command compensation SKA may be multiplied in a multiplier, rather than being added to each other in the adder 14 in FIG. 1. In this modification, the armature current command compensation SKA serves as a coefficient, rather than the number in the same unit system as the armature current amplitude command SIQ.

(2) The function pattern shown in FIG. 2(*b*) may be expressed as a linear expression (a straight line) between Td=0 and Tmax, rather than having a breakpoint at the torque threshold Td as shown.

(3) The function patterns shown in FIGS. 2(*b*) and 2(*c*) may be expressed as a curved line, such as a quadric, rather than mainly as a linear expression (a straight line) as above.

(4) The function patterns shown in FIGS. 2(*b*) and 2(*c*) may be expressed using a data map, rather than an expression.

Figure 7:
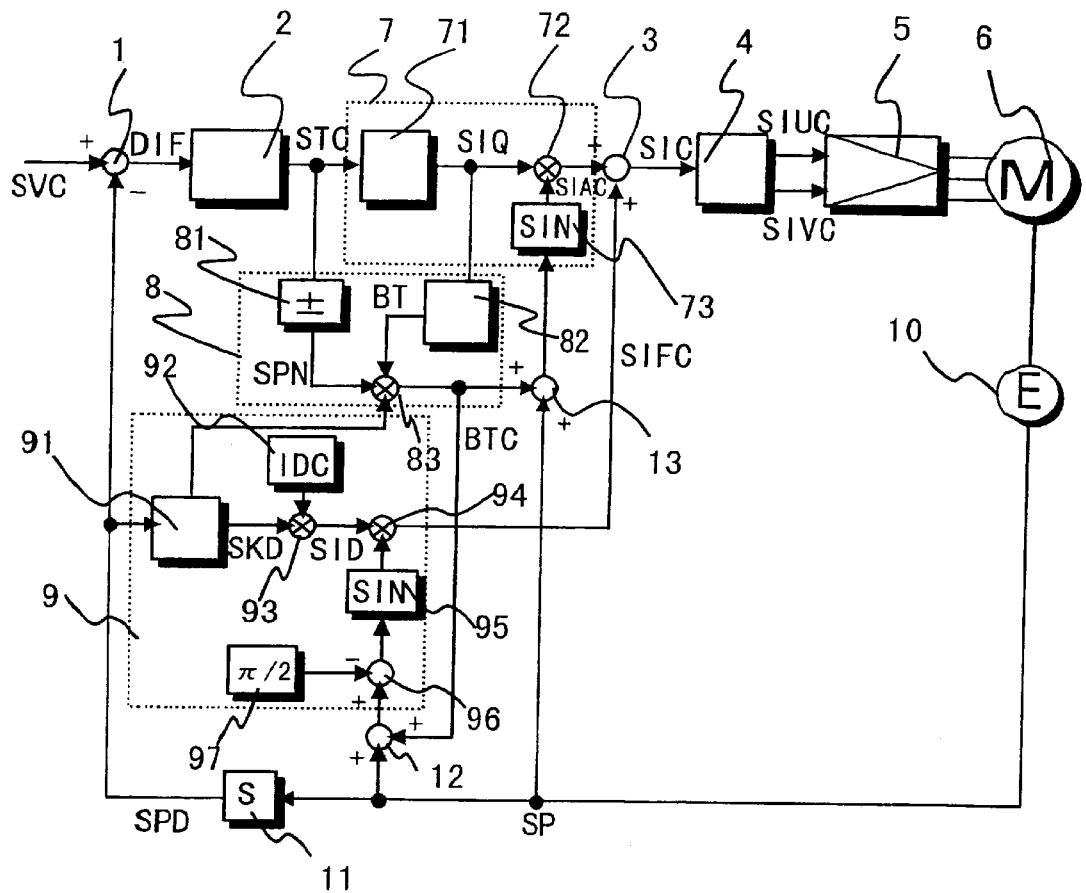
FIG. 7 is a diagram showing a controller for a reluctance type synchronous motor according to a second preferred embodiment of the present invention.

FIG. 7 shows a second preferred embodiment of the present invention, which includes a phase shifter 8 in addition to a conventional structure. In the following, the second preferred embodiment will be described referring to the drawings.

A phase shifter 8 comprises a polarity judging section 81, a phase shift amount calculator 82, and an adder 83. The polarity judging section 81 outputs a coefficient SPN (SPN= ±1) in accordance with the polarity of a torque command STC to the multiplier 83. The phase shift amount calculator 82 outputs an absolute phase shift amount BT in accordance with a armature current amplitude SIQ to the multiplier 83. In the adder 83, the coefficient SPN, the absolute phase shift amount BT, and a field current coefficient SKD, which is an output from the field current coefficient calculator 91, are multiplied so that a phase shift amount BTC with polarity is obtained according to a function requiring reference to the torque command STC and the armature current amplitude SIQ. The obtained phase shift amount BTC is supplied to adders 12 and 13. In the adders 12 and 13, the phase shift amount BTC is added to a rotor position SP, so that the results are input to the field current calculator 9 and the torque command-current converter 7 to obtain a field current command SIFC and an armature current command SIAC, respectively. In the adder 3, the field current command SIFC and the armature current command SIAC are added by means of vector addition, so that the resultant combined current command SIC is output to the phase distributor 4. Thereafter, the current commands SIVC and SIUC with respective phases are amplified in the amplifier 5 before being output to drive the motor 6.

Figure 8:
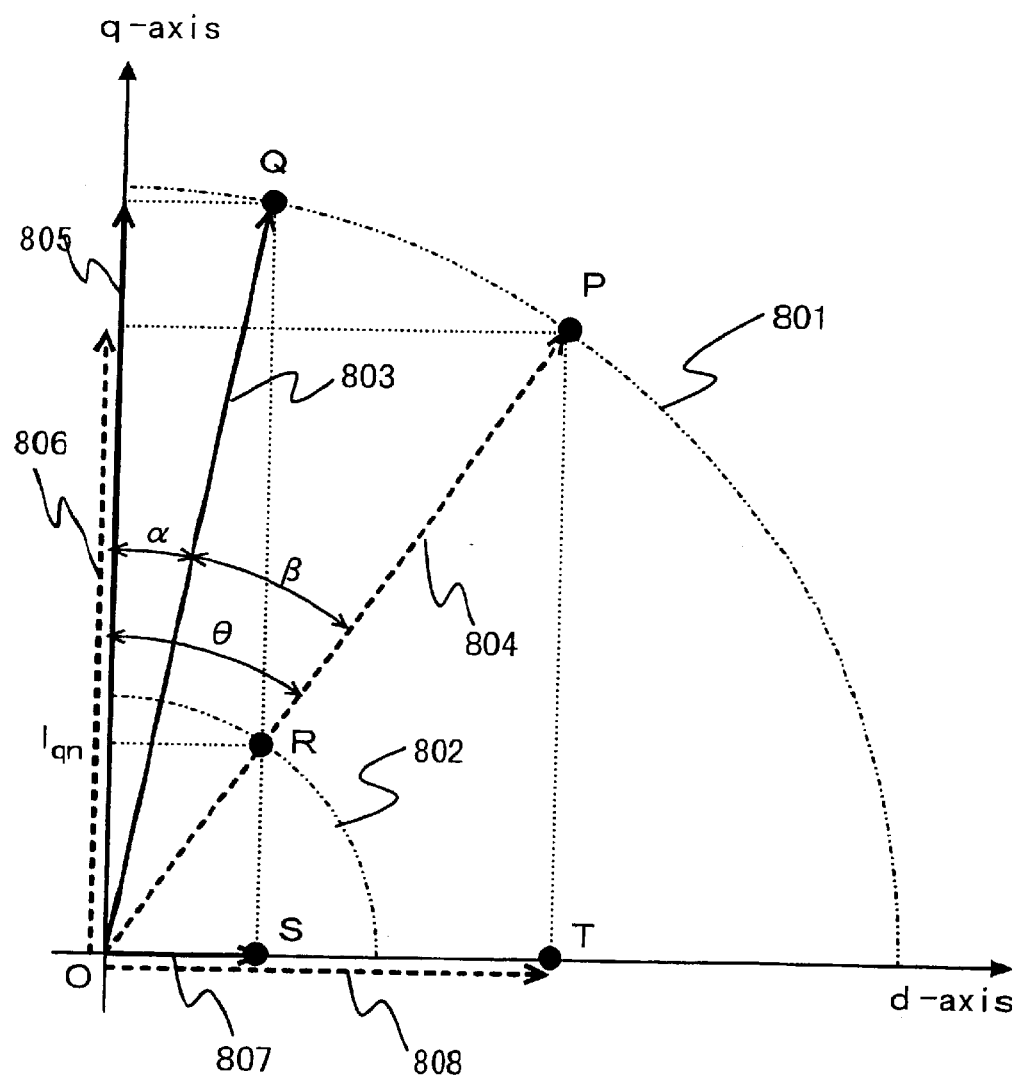
FIG. 8 is a diagram explaining current control vector in the second and third preferred embodiments.

FIG. 8 is a vector diagram concerning current control according to the second preferred embodiment of the present invention. For brevity of explanation, a vector locus is not multiplied by a field current coefficient SKD. A current can be understood as being separated into a field current, relative to a d-axis, and an armature current, relative to a q-axis. Conventionally, a field current can be set only as either a vector O-S (807) or a vector O-T (808). As a current can flow only within the current limitation circle 801 due to the capability of the amplifier, when a field current is set as a vector O-S (807), a combined current will be expressed as a vector O-Q (803) with an angle $\alpha$ formed with respect to the q-axis. Also, with a field current set as a vector O-T (808), the resultant combined current is expressed as a vector O-P (804). In the above, armature current components are shown as vectors 805 and 806, respectively.

In conventional control, when a field current is set as a vector O-S (807), the locus of a vector for control goes S-Q, and when set as a vector O-T (808), the locus goes T-P. In the second preferred embodiment of the present invention, on the other hand, while a field current is fixed as a vector O-S (807), the locus of a vector goes S-R when an armature current is equal to or less than the threshold Iqn, and goes R-P, resulting from a phase shift $\beta$, when an armature current exceeds the threshold Iqn.

That is, this embodiment is characterized by the fact that, while a field current takes a constant value as a vector O-S, the vector shifts in phase by $\beta$ when the armature current exceeds the threshold value Iqn, thereby changing field and armature current components of the combined current. Note that as a phase shift $\beta$ is multiplied by a field weakening coefficient when applying field weakening control, the current component resulting from phase shifting is resultantly subjected to field weakening.

Figure 9:
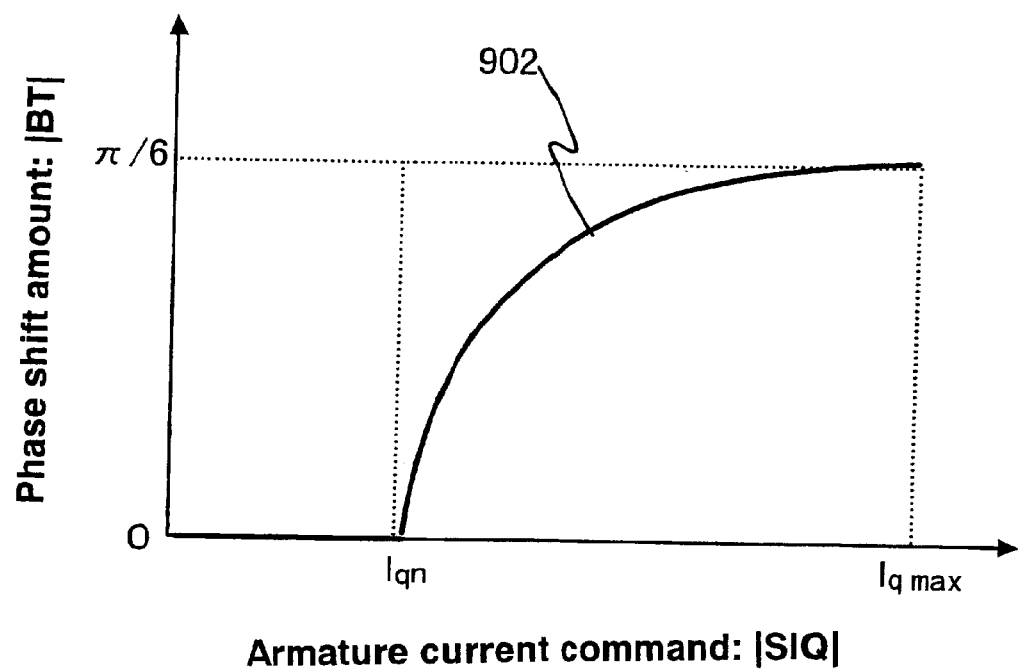
FIG. 9 is a diagram showing an example of a function pattern applied to a phase shift amount calculator 82.

FIG. 9 is a diagram showing an example of a function pattern applied to the phase shift amount calculator 82. With the function pattern 902, the absolute phase shift amount BT becomes zero (BT=0) when the armature current amplitude command SIQ is equal to or less than the threshold Iqn, and takes a function in accordance with a armature current amplitude SIQ when the armature current amplitude command SIQ is equal to or more than the threshold Iqn. This embodiment is arranged such that the absolute phase shift amount BT becomes $\pi/6$ when the armature current amplitude SIQ is equal to Iqmax (SIQ=Iqmax).

Figure 10A:
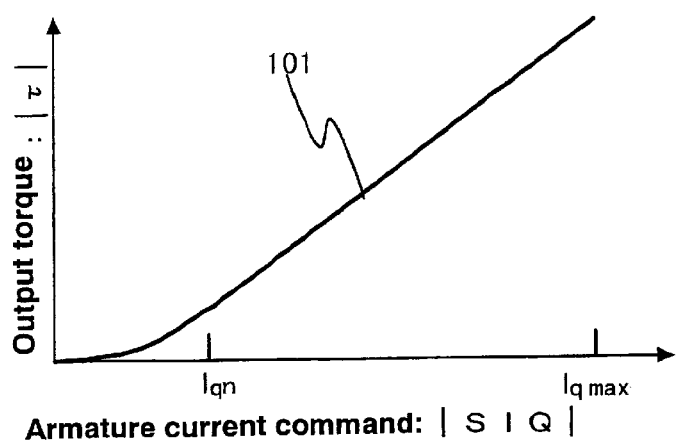
FIGS. 10(a–c) are diagrams showing an effect achieved by a phase shifter 8 in the second preferred embodiment and that by a field current compensator 98 in the third preferred embodiment.
Figure 10B:
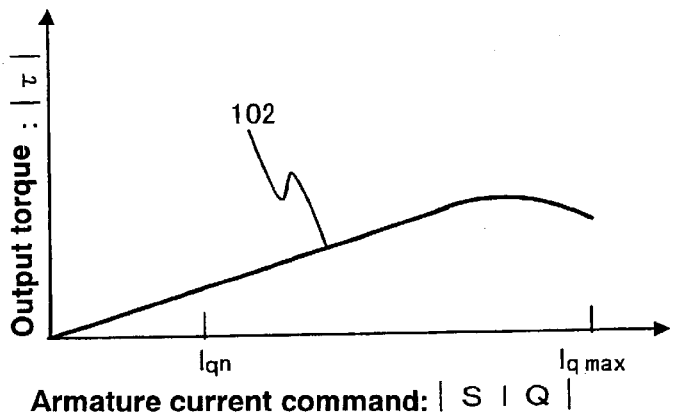

FIG. 10 is a diagram explaining an effect achieved by the phase shifter 8. FIGS. 10(*a*), 10(*b*), 10(*c*) respectively show variation of an output torque with respect to an armature current amplitude command SIQ. Specifically, the pattern 101, shown in FIG. 10(*a*), shows variation of an output torque subjected to current control using a conventional vector locus O-P. In this case, a field current varies upon variation of an armature current command. However, when an armature current is small, the torque characteristics do not present linearity due to a dead band. The pattern 102, shown in FIG. 10(*b*), shows variation of an output torque subjected to current control using a conventional vector locus O-Q. As shown, a dead band caused with a small armature current is not present, differing from FIG. 10(*a*). However, when a field current is small in view of an armature current, armature reaction will be caused as the armature current becomes larger, deteriorating linear torque characteristics. The pattern 102, shown in FIG. 10(*c*), shows variation of an output torque subjected to current control using a vector locus S-R-P according to the second preferred embodiment of the present invention. As shown, despite a breakpoint caused with the armature current amplitude command SIQ equal to or around the threshold Iqn, the entire characteristic is simple (linear), compared to those relative to FIGS. 10(*a*) and 10(*b*).

Figure 11A:
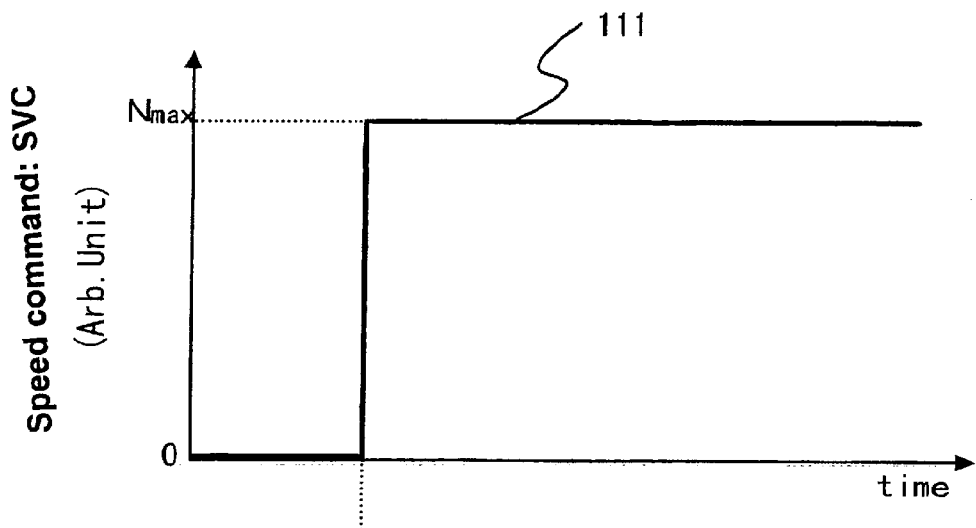
FIGS. 11(a,b) is a diagram showing response characteristics of a rotor speed with respect to a speed command in the second and third preferred embodiments.
Figure 11B:
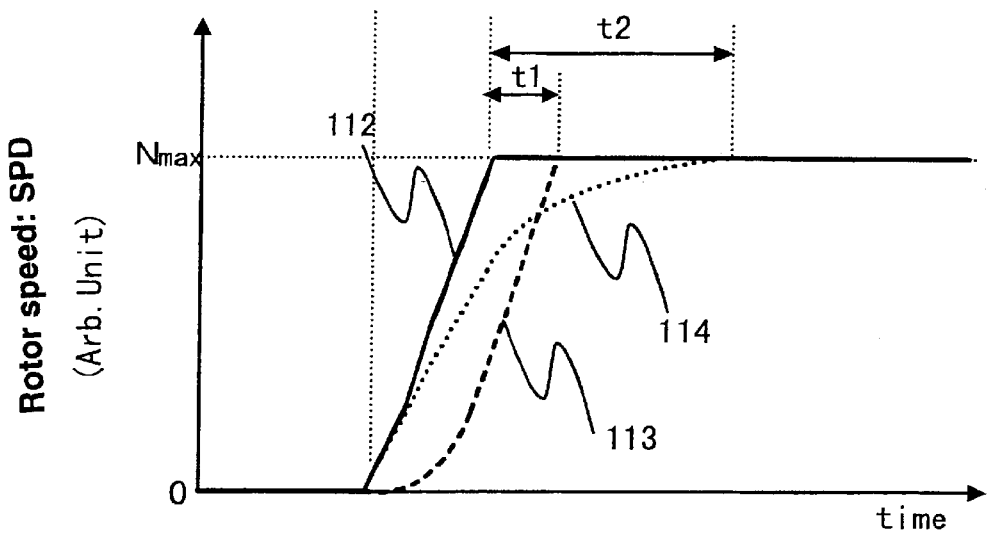

FIGS. 11(a) and 11(b) show response characteristics of a rotor speed SPD with respect to a speed command SVC in evaluation of motor performance. (This is generally referred to as step response as it measures response with respect to stepwise commands.) Specifically, in FIG. 11(a), the speed command is increased from zero to Nmax at a desired time.

FIG. 11(b) shows rotor response corresponding to FIG. 11(a). Characteristic 112 represents characteristics of current control (a vector locus S-R-P) according to the second preferred embodiment of the present invention, shown in FIG. 8. Characteristics 113 and 114 show characteristics of conventional current control (vector locus O-P, S-Q). It is known that, with conventional current control, an acceleration time is longer by t1, t2 than that with current control according to the second embodiment.

Figure 12:
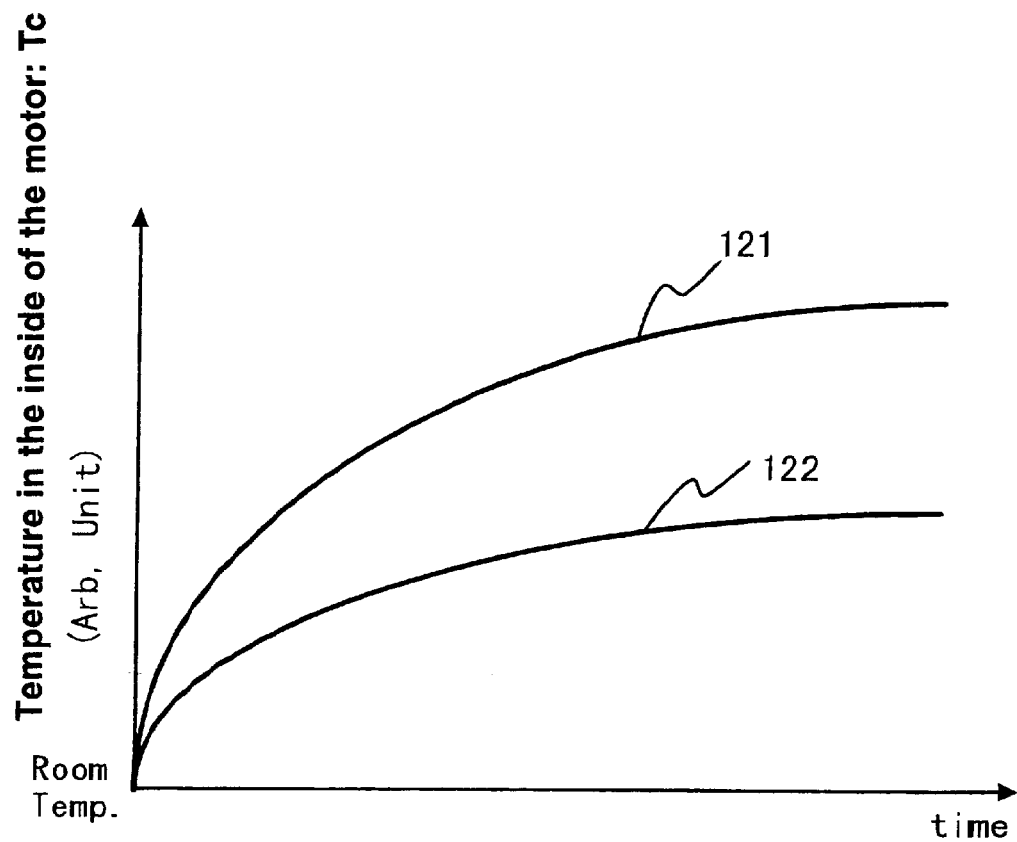
FIG. 12 is a diagram showing an increase of temperature in the inside of the motor in the second and third preferred embodiments.

FIG. 12 is a diagram showing a comparison result concerning temperature increase in the inside of motors subjected to the same continuous driving test. The characteristic curve 121 represents characteristics when conventional current control (a vector locus O-P) is applied, while the characteristic curve 122 represents characteristics when current control (a vector locus S-R-P) according to the second embodiment of the present invention is applied. It is known from the diagram that the current control of the second embodiment causes smaller temperature increase than conventional current control, affording heat allowance.

It should be noted that the present invention is not limited to the second preferred embodiment, and may be modified as follows without depart from the gist thereof.

(1) The function pattern shown in FIG. 9 may be a straight line rather than a curved line, and may be discontinuous.

(2) The function patterns shown in FIG. 9 may be expressed using a data map, rather than an expression.

(3) Phase shift applied in the embodiment shown in FIG. 7 may be given to a combined current, rather than individually to field and armature currents.

Figure 13:
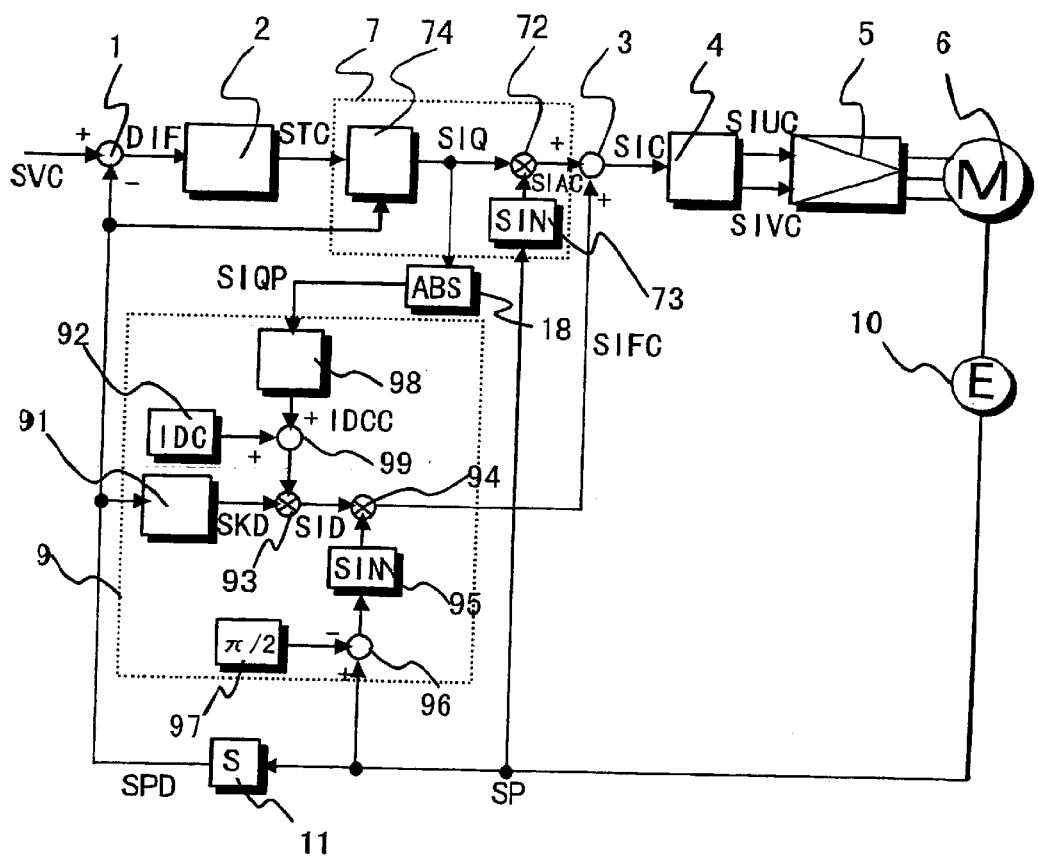
FIG. 13 is a diagram showing a controller for a reluctance type synchronous motor according to a third preferred embodiment of the present invention.

FIG. 13 shows a third preferred embodiment of the present invention, including an armature current coefficient calculator 74, an absolute value device 18, and a field current compensator 98 in addition to a conventional structure. In the following, the third preferred embodiment will be described referring to the drawings.

In the torque command-current converter 7, referring to the rotor speed SPD the armature current coefficient calculator 74 multiplies an armature current coefficient SKQ and a torque command STC for level conversion into an armature current amplitude SIQ. The armature current coefficient calculator 74 also acts as a limiter.

The absolute value device 18 obtains an absolute value of an armature current amplitude SIQ with polarity to output an armature current amplitude SIQP to the field current compensator 98. In the field current compensator 98, with reference to the absolute armature current amplitude SIQP, a field current compensation IDCC is output. In the field current calculator 9, the field current coefficient calculator 91 obtains a field current coefficient SKD, referring to a rotor speed SPD, to output to the multiplier 93. The adder 99 adds a default field current IDC and an output from the field current compensator 98, or a field current compensation IDCC, and the multiplier 93 then multiplies the addition result by the field current coefficient SKD. The resultant field current amplitude SID is then output to a multiplier 94, where the amplitude SID is multiplied by an output from the phase distributor 95. The obtained field current command SIFC is then output to the adder 3. The adder 3 conducts vector addition with respect to the field current command SIFC and the armature current command SIAC into a combined current command SIC, which is then output into the phase distributor 4. Thereafter, current commands SIUC, SIVC with respective phases are amplified by the amplifier 5 before being output to drive the motor 6.

The difference between the second and third preferred embodiments will next be described with reference to FIG. 8.

In the second embodiment, current control using a vector locus S-R-P is achieved with an arrangement in which, while a field current is fixed as a vector O-S, the vector locus goes S-R when the armature current is equal to or less than the threshold Iqn, and goes R-P, as a result of phase shifting, when the armature current is equal to or more than the threshold Iqn. On the other hand, in the third embodiment, current control using a vector locus S-R-P is achieved through addition of a field current compensation IDCC to a constant field amplitude IDC when the armature current exceeds the threshold Iqn. Therefore, as the sum of addition of the constant field amplitude IDC and a field current compensation IDCC is multiplied by a field current coefficient while field weakening control is applied, field weakening can be resultantly achieved.

Figure 14A:
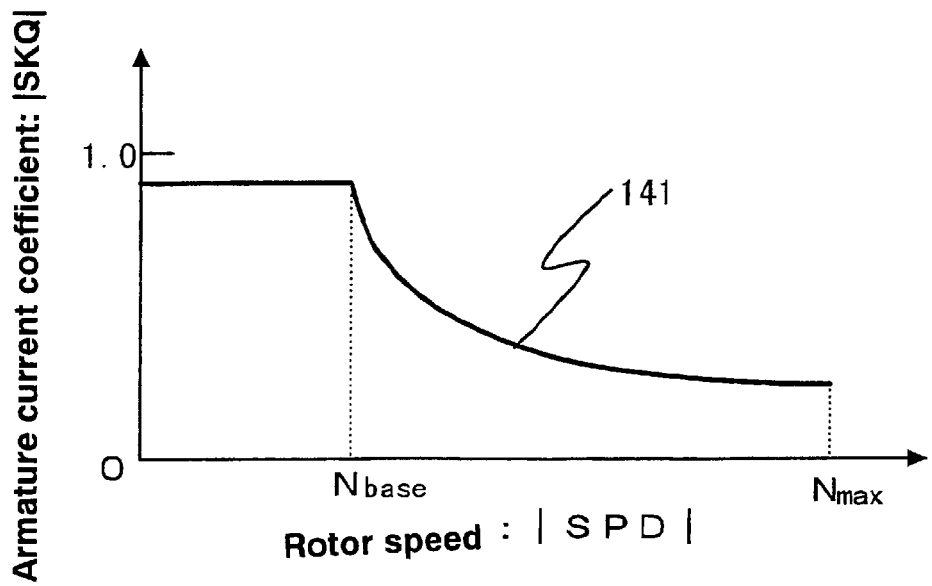
FIGS. 14(a,b) are diagrams showing an example of function patterns applied to an armature current coefficient calculator 74 and a field current compensator 98, respectively.
Figure 14B:
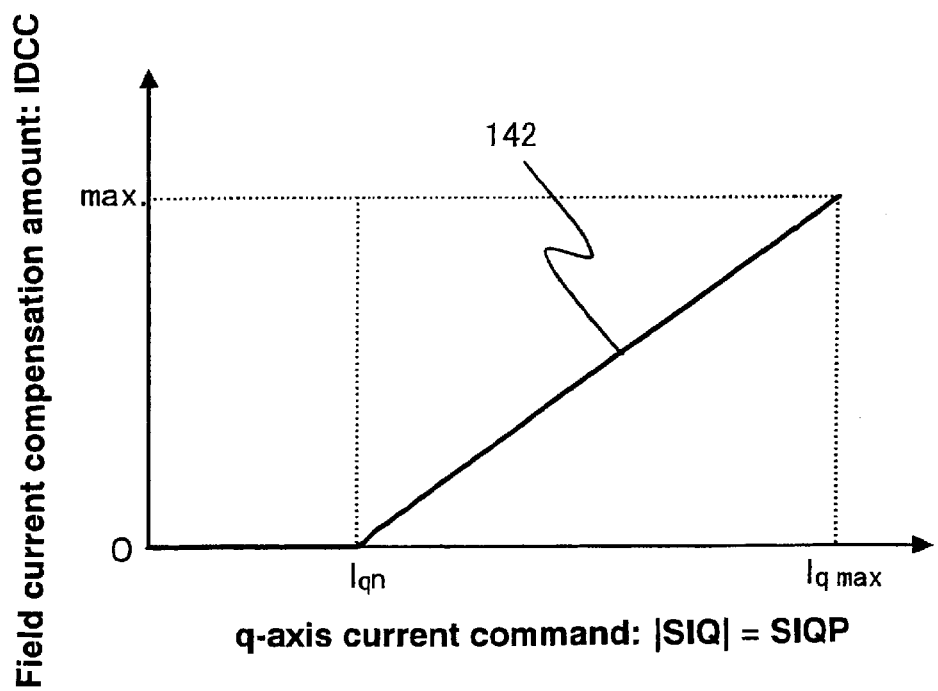
Figure 15:
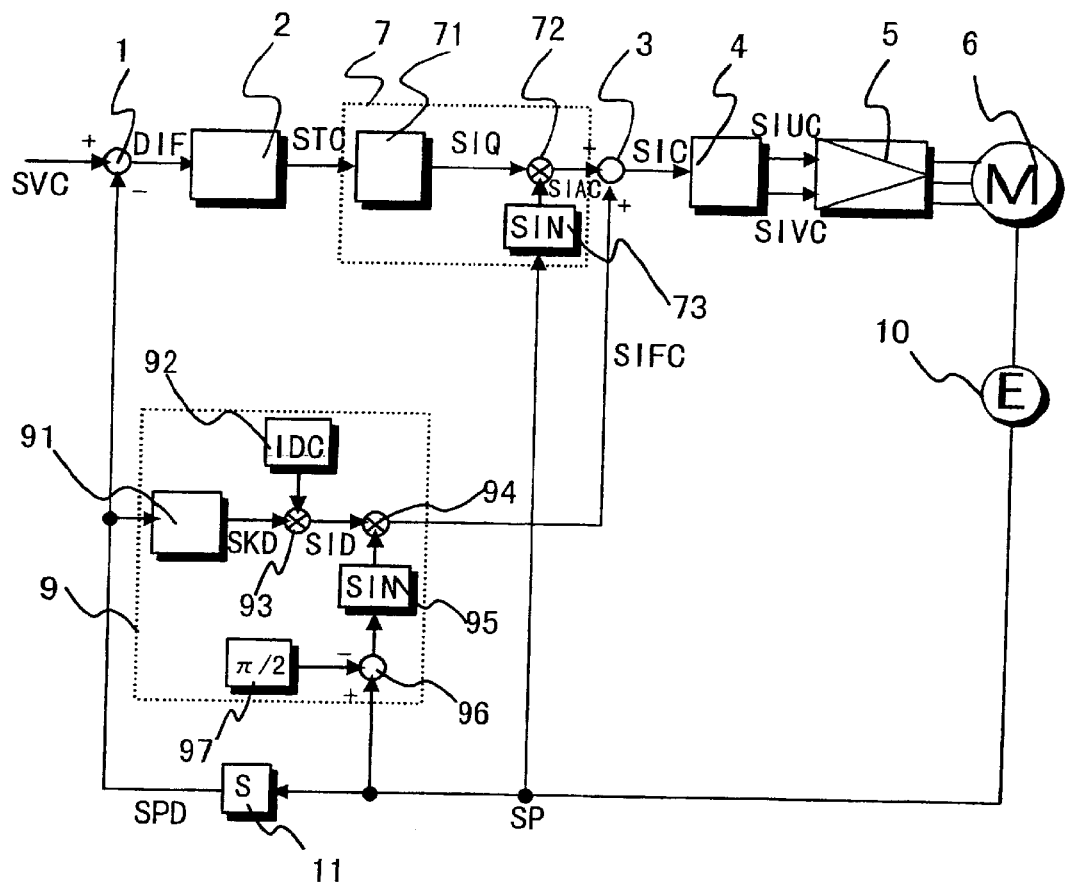
FIG. 15 is a diagram explaining a conventional controller for a reluctance type synchronous motor.

FIGS. 14(a) and 14(b) are diagrams showing examples of a function pattern applied to the armature current coefficient calculator 74 and the field current compensator 98, respectively. Specifically, FIG. 14(a) relates to processing by the armature current coefficient calculator 74, which outputs, similar to the field current coefficient calculator 91 relative to FIG. 2(a), a armature current coefficient SKQ which takes a constant value when the rotor speed DPD is equal to or lower than a base rotation speed Nbase, and takes a value of function 32 in accordance with the rotor speed SPD when the rotor speed is between the base rotation speed Nbase and the maximum rotation Nmax. The difference from the field current coefficient calculator 91 lies in the fact that the armature current command coefficient SKQ relative to the armature current coefficient calculator 74 takes a value equal to or less than 1.0 when the rotation speed is equal to or less than the base rotor speed Nbase. This is because, as can be seen from FIG. 8, a current value usable for an armature current, obtained through deduction of a field current component, is always equal to or less than 100% of a current limit value defined by an amplifier in use.

FIG. 14(b) relates to processing by the field current compensator 98, which outputs a field current compensation IDCC based on the function 33 when an armature current exceeds the threshold Iqn.

Figure 10C:
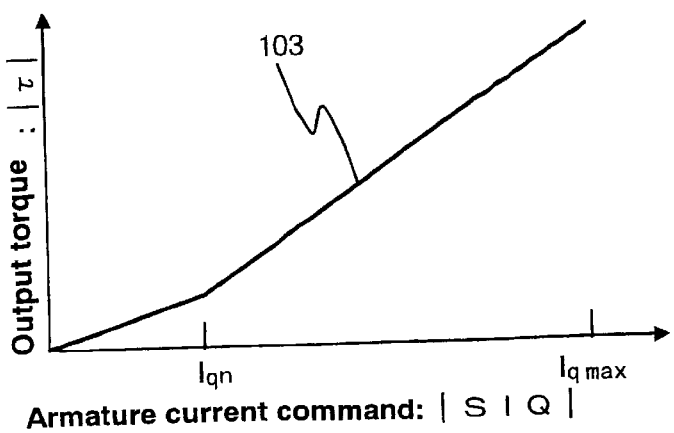

Note that the field current compensator 98 according to the third preferred embodiment produces the same effect as is achieved using the phase shifter 8 in the second preferred embodiment, presenting the characteristics shown as pattern 103 in FIG. 10(c). Also, as to the response characteristics of a rotor speed SPD with respect to a speed command SVC in evaluation of motor performance (FIG. 11), and temperature increase in the inside of the motor in the same continuous driving test (FIG. 10), the same effect as is achieved by the second preferred embodiment can be achieved.

It should be noted that the present invention is not limited to the above third preferred embodiment, and can be modified as follows without departing from the gist thereof.

(1) In the function pattern shown in FIG. 14(b), the field current compensation IDCC may not be equal to zero when an armature current is equal to or less than the threshold Iqn, rather than being zero as shown.

Also note that the present invention may be applied to a linear reluctance type motor, rather than a rotor type motor which is referred to in the above description for the first to third preferred embodiments.

What is claimed is:

1. A controller including
    a reluctance type synchronous motor having, inside a rotor, magnetic force insulation means such that magnetic reluctance caused on a surface of the rotor made of soft magnetic material is different in a rotation direction viewed from a stator, whereby magnetomotive force due to the stator is generated penetrating a magnetic pole, where the magnetic reluctance is weak, for generation of a torque to rotate the magnetic pole of the rotor to move in a direction of the magnetomotive force,
    detection means for detecting a rotor position of the rotor, and,
    current command calculation means for obtaining a current command by adding an armature current command and a field current command at the rotor position for supplying a current to the synchronous motor, the controller comprising:
        a calculator for obtaining a field current command by multiplying a field current command corresponding to the rotor speed, and a coefficient supplied from a field current compensation coefficient calculator, the coefficient corresponding to a torque command.

2. A controller for a reluctance type synchronous motor according to claim 1, further comprising
    an armature current compensation calculator for calculating an armature current command by calculating a compensation value with reference to an armature current command, and compensating an armature current amplitude using the calculated compensation value.

3. A controller including
    a reluctance type synchronous motor having, inside a rotor, magnetic force insulation means such that magnetic reluctance caused on a surface of the rotor made of soft magnetic material is different in a rotation direction viewed from a stator, whereby magnetomotive force due to the stator is generated penetrating a magnetic pole, where the magnetic reluctance is weak, for generation of a torque to rotate the magnetic pole of the rotor to move in a direction of the magnetomotive force,
    detection means for detecting a rotor position of the rotor, and,
    current command calculation means for obtaining a current command by adding an armature current command and a field current command at the rotor position for supplying a current to the synchronous motor, the controller comprising:
        a field current amplitude calculator for outputting a constant field current; and
        a phase shift calculator for calculating a phase shift amount by multiplying a code value output from a polarity judgment section referring to a torque command or an armature current, and a function referring to a torque command or an armature current amplitude,
    wherein
        the phase shift amount is calculated through multiplication using a coefficient according to a rotor speed.

4. A controller including
    a reluctance type synchronous motor having, inside a rotor, magnetic force insulation means such that magnetic reluctance caused on a surface of the rotor made of soft magnetic material is different in a rotation direction viewed from a stator, whereby magnetomotive force due to the stator is generated penetrating a magnetic pole, where the magnetic reluctance is weak, for generation of a torque to rotate the magnetic pole of the rotor to move in a direction of the magnetomotive force, detection means for detecting a rotor position of the rotor, and,
    current command calculation means for obtaining a current command by adding an armature current command and a field current command at the rotor position for supplying a current to the synchronous motor, the controller comprising:
        a field current amplitude calculation section for outputting a constant field current; and
        a field current compensator for referring a torque command or an armature current to add to the field current amplitude,
    wherein
        the armature current amplitude is multiplied by a compensation coefficient which is a function pattern in accordance with a rotor speed.

* * * * *